INVENTOR.
Howard R. Stewart.
BY F. K. Caswell
ATTORNEY.

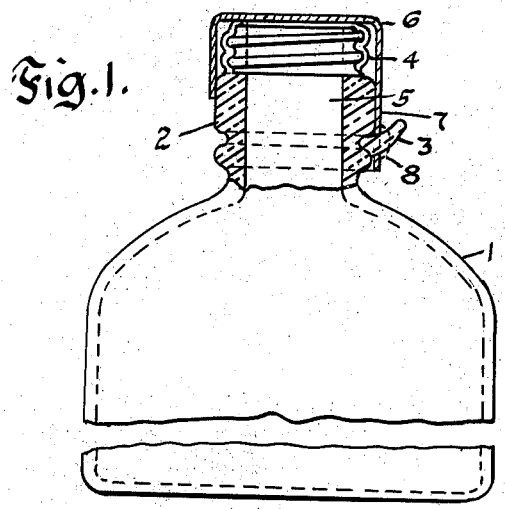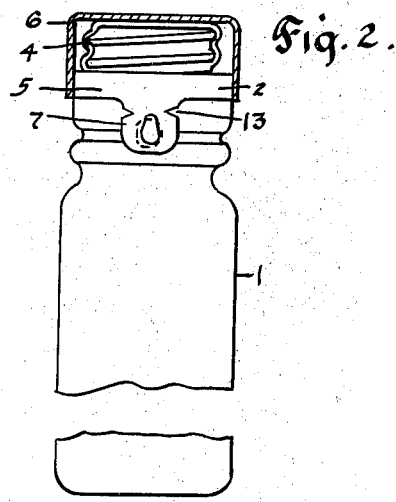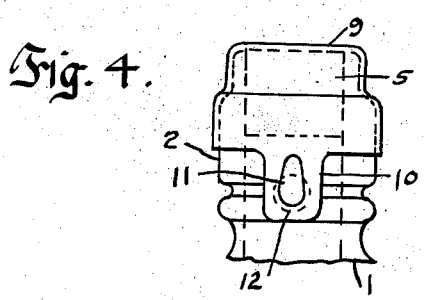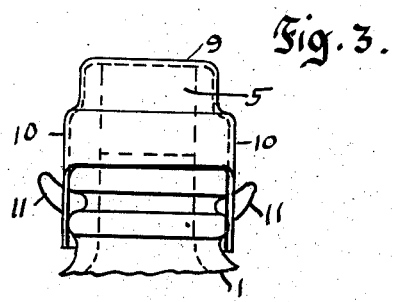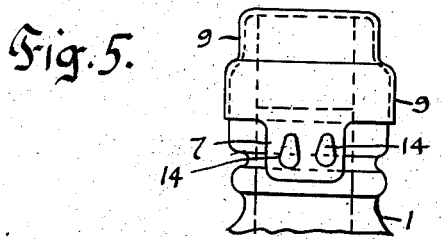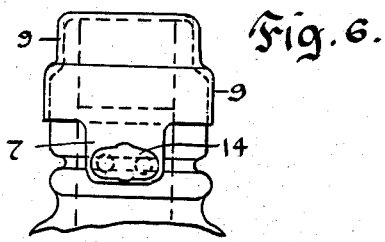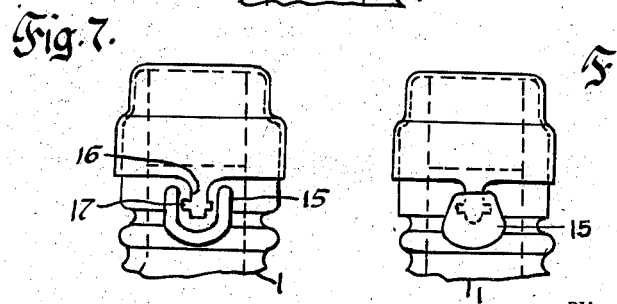

Aug. 12, 1941.   H. R. STEWART   2,252,217
MEANS FOR SEALING NONRESEALABLE GLASS CONTAINERS
Filed Oct. 5, 1938   3 Sheets-Sheet 3
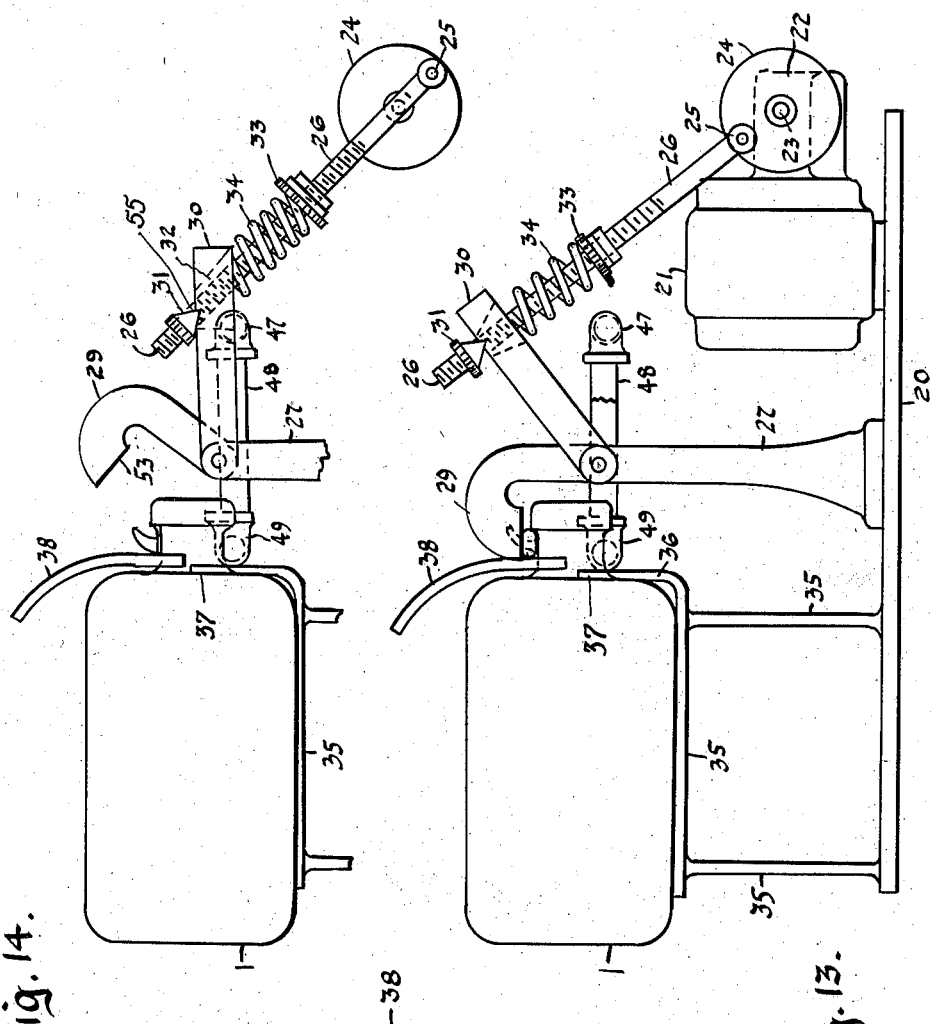
INVENTOR.
Howard R. Stewart.
BY F. K. Caswell
ATTORNEY.

Patented Aug. 12, 1941

2,252,217

UNITED STATES PATENT OFFICE 2,252,217

MEANS FOR SEALING NONRESEALABLE GLASS CONTAINERS

Howard R. Stewart, Glendale, Calif., assignor of one-third to Lewis D. Collings, Los Angeles, Calif.

Application October 5, 1938, Serial No. 233,393

6 Claims. (Cl. 226—81)

My invention relates to that class of devices which are designated to provide a means for sealing glass containers in such a manner that the seal must necessarily be broken or disfigured before the container can be opened and its contents removed. The object is to prevent the replacement of such a seal and also to make it perfectly obvious that the seal, and presumably the contents of the container, have been tampered with.

A further purpose of my invention is to provide a process for, and a suitable machine for, the accomplishment of the sealing of such containers, including means for applying heat to a portion of a filled, closed and capped glass container, making a portion of the said container soft or plastic and providing means for forming said plastic glass into a seal over a portion of the said encasement.

Figure 9:
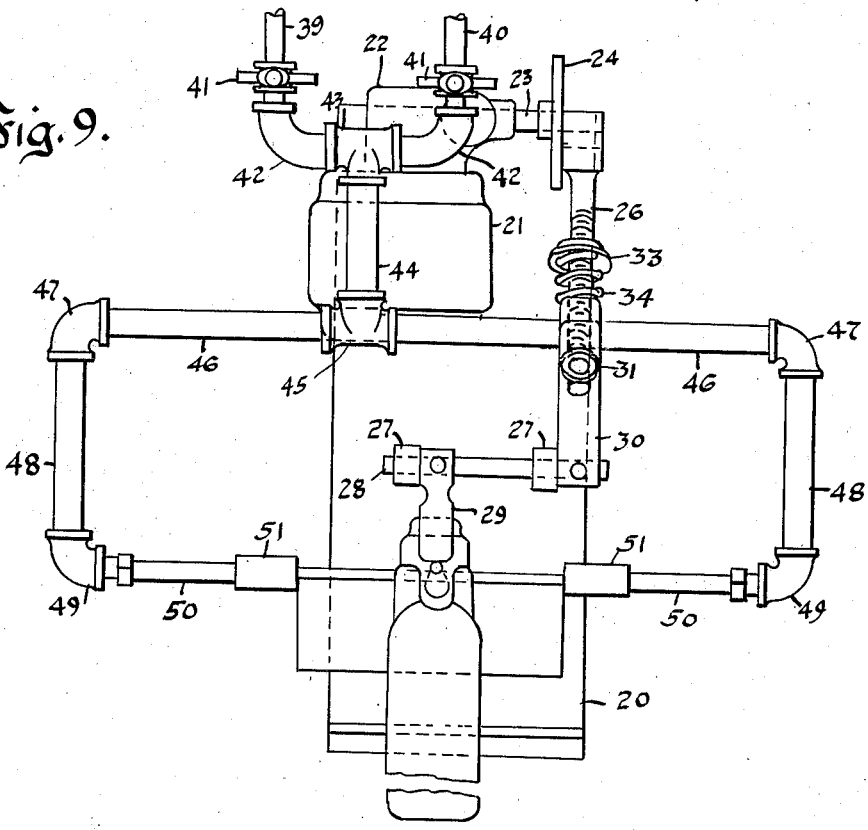
Figure 10:
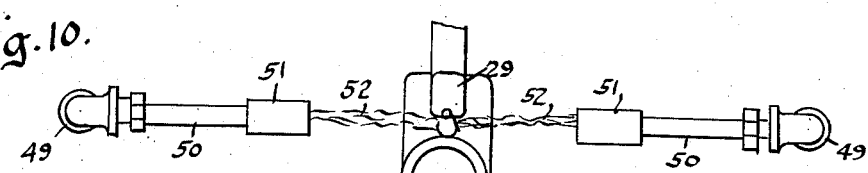
Figures 11, 12:
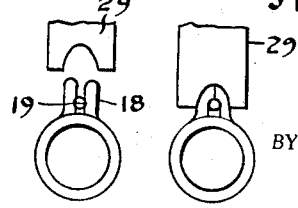

I accomplish these results by means of the containers and mechanism illustrated by the accompanying drawings in which similar numerals refer to similar parts in the several views. Figure 1 is the side elevation of a container showing the neck and associated parts in section and provided with a screw-threaded cover and an encasement with an extension shown in position over a glass protuberance integral with the neck of said container. Figure 2 is a front elevation of the container, screw-threaded cover, and the encasement partly in section and with its extension assembled over the protuberance as shown in Figure 1. Figure 3 is a sectional view illustrating a modification of the container as shown in Figures 1 and 2, in which a cork is used in place of the screw-threaded cover and the sealing encasement is provided with a plurality of extensions adapted to fit over the protuberances which are integral with the neck of the container, and showing the seal in dotted lines. Figure 4 is a front elevation of the design as shown in Figure 3, also showing the seal in dotted lines. Figure 5 is a front view of the neck of the container having a group of protuberances located on the side of said neck and adapted to receive extensions of an encasement covering said container which is adapted to be sealed by heat and pressure. Figure 6 is a front view similar to Figure 5 but showing the protuberances in the closed position after sealing. Figure 7 is a front view of the neck of the container provided with a notched or U-shaped protuberance adapted to receive an extension of the encasement with projections integral with said extension. Figure 8 shows a front view of the type shown in Figure 7 but in a closed position, the glass protuberance having been made plastic and compressed so that the extension and its lateral projections are embedded in the protuberance. Figure 9 is a plan view of a machine for sealing the said glass containers. Figure 10 is a diagrammatic end elevation of a section through the neck of the said container showing the location of the burners and the flames impinging against the protuberance to be sealed and the pressure arm in its relation to the said protuberance when forming a seal. Figure 11 is a detail view showing the form of the under side of the pressure arm in position ready to close the group of bifurcated or notched protuberances. Figure 12 is a detail of the pressure arm in its closed position when sealing a group of bifurcated protuberances or the notched type shown in Figures 7 and 8. Figure 13 is a side elevation, partly diagrammatic, of the sealing machine with the glass container in position and with the pressure arm in its closed position for sealing; also showing diagrammatically the guard for localizing the heat when in operation. Figure 14 is a similar diagrammatic side elevation showing the protuberance before being sealed and also showing the pressure arm in its upward position. Figure 15 is a detail front elevation of the guard showing its open position in dotted lines.

The design of the container shown in Figures 1 and 2 consists of the body of the container 1 having a neck 2 and having integrally formed on said neck a protuberance 3. The upper portion of the said neck 2 is formed to receive a screw-threaded cover 4 which may be used either with or without a cork, the latter being shown at 5. Over the cover 4 and the neck 2 is an encasement 6 having integral therewith an extension 7 which has in its lower portion an opening adapted to be folded over the protuberance 3 preparatory to being sealed. The shape of the protuberance after forming or sealing is as shown by the dotted lines at 8. In the form shown in Figures 3 and 4 the screw-threaded cover is omitted, the cork 5 or other closure means being used. The encasement 9 is provided with a plurality of extensions 10 each of which is adapted to be folded over the protuberances 11 preparatory to sealing, the shape of the protuberances after sealing being shown by the dotted lines 12. In any or all of these designs the extensions 7 or 10 may be provided with notches or breaking points 13 which are adapted to be readily broken when it is desired to remove the encasement 9.

In the type shown in Figures 5 and 6 a group of protuberances 14 are molded integrally with the neck of the container 1, and the encasement 9 is provided with an extension 7 having openings corresponding to the protuberances 14. When sealed by the application of heat and pressure the protuberances 14 are flattened into a seal over the said extension 7. In the form shown in Figures 7 and 8 the protuberance 15 which is integral with the neck of the container 1 is of a notched or U-shaped type adapted to receive the encasement extension 16, the latter having lateral projections 17 adapted to be embedded in the glass during the application of heat and pressure. The protuberance 18 may be bifurcated as shown in Figure 11 and adapted to have the encasement extension 19 assembled therethrough and sealed by heat and pressure as shown in Figure 12.

The construction of a preferred type of mechanism adapted to apply heat and pressure to the protuberances is as follows: 20 is a supporting base-plate having mounted thereon a motor 21 preferably provided with a speed reducing mechanism as at 22 and having a slow speed shaft 23 projecting from the said speed reducing mechanism 22 and having mounted thereon a crank disc 24. On the crank disc 24 is a crank pin 25 on which is journaled the lower end of a connecting rod 26. Also mounted on the base 20 is a bracket 27 having journaled therein a rocker shaft 28. Adjustably secured to the rocker shaft 28 is a pressure arm 29 and the walking beam 30. The connecting rod 26 is threaded to receive a V-nut 31, the V-shaped point of which is adapted to rest in a V-notch 55 located on the walking beam 30. This V-nut 31 can be adjusted by the threads on the connecting rod 26, the said connecting rod passing upwardly through a slot 32 in the walking beam 30. Located between the walking beam 30 and the crank pin 25 is a cushion adjustment nut 33, the same being threaded on the connecting rod 26. Located between the under side of the beam 30 and the face of the nut 33 is a cushion spring 34 which will be more fully hereinafter described. Also mounted on the base 20 is a supporting bracket 35 adapted to support a container 1, the shoulders of said container being positioned by the supporting flange 36, this flange having a notch 37 centrally located therein and adapted to receive the neck of the container 1. Located above the neck of the container 1 and extending downwardly on each side of the said neck and also extending upwardly from the said neck is a guard 38 which is hingedly mounted in such a manner that it can be swung into or out of position relative to the neck of the container. This guard is for the purpose of shielding the body of the container from the direct heat from the flame jet.

The means for heating the protuberances may be of various design, but the one shown herewith has proven to be very satisfactory. It consists of the pipes 39 and 40, one being connected to a source of air under pressure and the other to a source of gas fuel. Located on each of these pipes are the control valves 41 by which the mixture can be varied to suit the most perfect combustion. The gas and air pipes 39 and 40 are connected through the valves 41 to the elbows 42, the T 43, the pipe 44, T 45, the pipes 46, elbows 47, pipes 48, elbows 49, and pipes 50, ending in the burners 51. While these pipes are shown as all lying in a single horizontal plane, one of the purposes of this pipe arrangement is that the burners 51 and their connecting pipes 48 can be rotated on the elbows 47 resulting in the raising or lowering of the burners 51. The burners 51, the pipes 50, and the elbows 49 may also be rotated on the pipes 48. The combination of these two movements, that is around the pipes 46 and the pipes 48, enables the burners 51 to be so adjusted that the flame jet 52 issuing therefrom may be directed to impinge against the protuberance on the neck of the container 1 in the most favorable direction. In place of these pipes flexible or copper tubes may be used, same being bent to shape as desired.

When the bifurcated form of protuberance, or the notched type such as shown in Figures 7 and 8, is used the two sides are closed or pressed together by downward pressure of the arm 29, this being accomplished by forming the underside of the pressure arm 29 into a cam-shaped recess adapted to bend and form the protuberance when plastic by the application of heat.

The operation of this mechanism is as follows: The container 1 is placed on the support 35 with its shoulders bearing against the flange 36 and having its neck resting in the notch 37. The guard 38 is then swung into position, and the burners 51, having been lighted and properly adjusted, throw small jets of flame 52 directly against the glass protuberance which results in the latter becoming plastic. While this container 1 and the guard 38 are being placed in position in the line of heat the pressure arm 29 is in its upward position as shown in Figure 14. At the same time the rotation of the crank disc 24 with its crank pin 25 starts from the position shown in Figure 14 and moves into the position shown in Figure 13, the lower edge 53 of the pressure arm 29 moving over the protuberance and pressing it down into the position as shown in Figure 13. In order to prevent an excess of pressure beyond that required to mold the seal the spring 34 can be adjusted by the nut 33 so that when the desired pressure is reached the remainder of the rotation and consequent movement of the connecting rod 26 is taken up by the said spring 34.

What I claim as my invention and desire to secure by Letters Patent is:

1. In a machine of the class described the combination of a holder adapted to hold a filled, closed, and partially encased glass container having integrally molded on the neck thereof a protuberance, and having an extension of said encasement assembled thereover; heating means for creating a temporary condition of plasticity in said protuberance, said means consisting of burners located one on each side of the said protuberance, and adapted to direct flame jets into contact with said protuberance, and means for pressing said protuberance while in a plastic condition into a seal over the extension of said encasement, said means including a source of power and motion, a crank, a walking beam connected to said crank, a connecting rod, a shaft on which is secured said walking beam, and a pressure arm, the action of the said mechanism resulting in an arcuate movement of the said pressure arm onto the plastic protuberance to be sealed.

2. In a machine of the class described the combination of a holder adapted to hold a filled, closed, and partially encased glass container having integrally molded on the neck thereof a protuberance, and having an extension of said encasement assembled thereover; heating means for creating a temporary condition of plasticity in said protuberance, said means consisting of burners located one on each side of the said protuberance and adapted to direct flame jets into contact with said protuberance, and means for pressing said protuberance while in a plastic condition into a seal over the extension of said encasement, said means including a source of power and motion, a crank, a walking beam connected to said crank, a connecting rod, a shaft on which is secured said walking beam, and a pressure arm, the action of the said mechanism resulting in an arcuate movement of the said pressure arm onto the plastic protuberance to be sealed, together with adjustable cushioning means interposed between the said connecting rod and said walking beam.

3. In a machine of the class described the combination of a holder adapted to hold a filled, closed and partially encased glass container having integrally moulded on the neck thereof a protuberance, and having an extension of said encasement assembled thereover; heating means for creating a temporary condition of plasticity in said protuberance, said means consisting of burners located one on each side of the said protuberance and adapted to direct flame jets into contact with said protuberance; and means for pressing said protuberance while in a plastic condition into a seal over a portion of said encasement extension, said means consisting of a source of power and motion, a crank, a walking beam connected to said crank, a connecting rod, a shaft on which is secured said walking beam, and a pressure arm, the action of the said mechanism resulting in an arcuate movement of the said pressure arm onto the plastic protuberance to be sealed, together with adjustable cushioning means interposed between the said connecting rod and said walking beam, and a guard-plate adapted to keep the flame from striking the container.

4. In a machine of the class described, the combination of a holder adapted to hold a filled, closed and partially encased glass container having integrally molded on the neck thereof a plurality of protuberances and having said partial encasement assembled over said protuberances; heating means for creating a temporary condition of plasticity in said protuberances, said means consisting of burners located one on each side of the said protuberances and adapted to direct flame jets into contact with said protuberances, and means for pressing together said protuberances while in a plastic condition into a seal over a portion of said encasement, said means consisting of a source of power and motion, a crank and a connecting rod actuated by said source of power and motion, a rocker shaft on which is secured a walking beam, and a pressure arm, the action of the said mechanism resulting in an arcuate movement of the said pressure arm against the plastic protuberances to be sealed.

5. In a machine of the class described the combination of a holder adapted to hold a filled, closed and partially encased glass container having integrally molded on the neck thereof a bifurcated protuberance and having said partial encasement extension assembled over, around and between said bifurcated protuberance; heating means for creating a temporary condition of plasticity in said protuberance, said means consisting of burners located one on each side of the said protuberance and adapted to direct flame jets into contact with said protuberance, and means for pressing together said protuberance while in a plastic condition into a seal over a portion of said encasement extension, said means consisting of a source of power and motion, a crank, a walking beam connected to said crank, a connecting rod, a rocker shaft on which is secured said walking beam, and a pressure arm, the action of the said mechanism resulting in an arcuate movement of the said pressure arm onto the plastic protuberance to be sealed, said pressure arm having its under side in the form of an inverted V for the purpose of convergently forming together the two elements of the said bifurcated protuberance as the pressure is applied by said pressure arm.

6. In a machine of the class described the combination of a holder adapted to hold a filled, closed and partially encased glass container having integrally molded on the neck thereof a notched or U-shaped protuberance and having an extension of the said partial encasement assembled therein; heating means for creating a temporary condition of plasticity in the said protuberance, said means consisting of burners located one on each side of the U-shaped protuberance and adapted to direct flame jets into contact with the said protuberance, and means for pressing together said U-shaped protuberance while in a plastic condition into a seal over a portion of the extension of the partial encasement of the container, said means consisting of a source of power and motion, a crank, a walking-beam, a connecting rod, a shaft on which is secured said walking-beam, and a pressure arm, the action of the said mechanism resulting in an arcuate movement of the pressure arm onto the plastic protuberance to be sealed, said pressure arm having its under side in the form of an inverted V for the purpose of convergently forming together the two sides of the U-shaped protuberance as the pressure is applied by the said pressure arm.

HOWARD R. STEWART.